United States Patent
Jiang et al.

(10) Patent No.: US 10,796,443 B2
(45) Date of Patent: Oct. 6, 2020

(54) IMAGE DEPTH DECODER AND COMPUTING DEVICE

(71) Applicant: Kneron, Inc., San Diego, CA (US)

(72) Inventors: Ming-Zhe Jiang, San Diego, CA (US); Yuan Du, Los Angeles, CA (US); Li Du, La Jolla, CA (US); Jie Wu, San Diego, CA (US); Jun-Jie Su, San Diego, CA (US)

(73) Assignee: Kneron, Inc., San Diego, CA (US)

( * ) Notice: Subject to any disclaimer, the term of this patent is extended or adjusted under 35 U.S.C. 154(b) by 105 days.

(21) Appl. No.: 16/162,909

(22) Filed: Oct. 17, 2018

(65) Prior Publication Data

US 2020/0126245 A1    Apr. 23, 2020

(51) Int. Cl.
| | | |
|---|---|---|
| G06T 7/73 | (2017.01) |
| G06T 7/55 | (2017.01) |
| G06K 9/62 | (2006.01) |
| G06K 9/38 | (2006.01) |
| H04N 5/33 | (2006.01) |
| H04N 5/91 | (2006.01) |
| H04N 5/765 | (2006.01) |
| H04N 13/128 | (2018.01) |

(52) U.S. Cl.
CPC .............. *G06T 7/55* (2017.01); *G06K 9/38* (2013.01); *G06K 9/6202* (2013.01); *H04N 5/33* (2013.01); *H04N 5/765* (2013.01); *H04N 5/91* (2013.01); *G06T 2207/10028* (2013.01); *G06T 2207/10048* (2013.01); *H04N 13/128* (2018.05)

(58) Field of Classification Search
None
See application file for complete search history.

(56) References Cited

U.S. PATENT DOCUMENTS

| | | | | |
|---|---|---|---|---|
| 8,330,831 B2* | 12/2012 | Steinberg | .............. | G06T 5/003 |
| | | | | 348/231.3 |
| 10,306,152 B1* | 5/2019 | Chu | .................. | H04N 5/2353 |
| 2003/0012277 A1* | 1/2003 | Azuma | ................ | G06T 7/70 |
| | | | | 375/240.08 |
| 2013/0250123 A1* | 9/2013 | Zhang | .................. | H04N 5/332 |
| | | | | 348/164 |
| 2014/0124004 A1* | 5/2014 | Rosenstein | ............ | G06T 7/246 |
| | | | | 134/18 |
| 2015/0309581 A1* | 10/2015 | Minnen | ................. | G06F 3/017 |
| | | | | 345/156 |
| 2017/0061701 A1* | 3/2017 | Mittal | .................... | G06T 5/002 |
| 2018/0286079 A1* | 10/2018 | Ben Moshe | .............. | G06T 7/85 |
| 2019/0215424 A1* | 7/2019 | Adato | ................ | G06Q 30/0629 |
| 2019/0325633 A1* | 10/2019 | Miller, IV | .......... | G06K 9/00597 |
| 2020/0074604 A1* | 3/2020 | Shibata | ................... | G06T 5/50 |
| 2020/0134857 A1* | 4/2020 | Khatoonabadi | ...... | H04N 17/002 |

FOREIGN PATENT DOCUMENTS

CN     102595151 A     7/2012

* cited by examiner

Primary Examiner — Howard D Brown, Jr.
(74) Attorney, Agent, or Firm — Muncy, Geissler, Olds & Lowe, P.C.

(57) ABSTRACT

An image depth decoder includes an NIR image buffer, a reference image ring buffer and a pattern matching engine. The NIR image buffer stores an NIR image inputted by a stream. The reference image ring buffer stores a reference image inputted by a stream. The pattern matching engine is coupled to the NIR image buffer and the reference image ring buffer, and performs a depth computation according to the NIR image and the reference image to output at least one depth value.

16 Claims, 13 Drawing Sheets

| original NIR data input | 1 | 2 | 3 | 4 | 5 | 6 | 7 | 8 | 9 | 10 | 11 | 12 | 13 | 14 | 15 | 16 | 17 | ... | 734 | 735 | 736 | | | |
|---|---|---|---|---|---|---|---|---|---|---|---|---|---|---|---|---|---|---|---|---|---|---|---|---|
| quantization result | | | | 1 | 2 | 3 | 4 | 5 | 6 | 7 | 8 | 9 | 10 | 11 | 12 | 13 | 14 | ... | 731 | 732 | 733 | 734 | 735 | 736 |
| depth image output | | | | | | | | | | | | | 1 | | | | 2 | ... | 361 | 362 | 363 | 364 | 365 | 366 | 367 | 368 |

FIG. 9

IMAGE DEPTH DECODER AND COMPUTING DEVICE

CROSS REFERENCE TO RELATED APPLICATIONS

The non-provisional patent application claims priority to U.S. provisional patent application with Ser. No. 16/162,909 filed on Oct. 17, 2018. This and all other extrinsic materials discussed herein are incorporated by reference in their entirety.

BACKGROUND

Technology Field

The present disclosure relates to a decoder and a computing device, and in particular, to an image depth decoder and a computing device.

Description of Related Act

The 3D image technology has been applied to many applications such as the 3D image display or face recognition. The depth generation solutions for 3D images can be classified into the following categories: ToF (Time-of-Flight), stereo camera, and structure light. The structure light category is specially targeting for human face recognition or other applications.

Regarding the face recognition application, the conventional face recognition generally uses the RGB image for detection and recognition. However, this recognition can be easily cheated by, for example, using an image of a target person. Accordingly, it is needed to improve the security level of face recognition.

Therefore, it is desired to add additional information for the reference of the 3D image or to provide another 3D image generation solution.

SUMMARY

This disclosure provides an image depth decoder and a computing device that can reduce the circuit layout area.

An image depth decoder comprises an NIR (near-infrared) image buffer, a reference image ring buffer, and a pattern matching engine. The NIR image buffer stores an NIR image inputted by a stream. The reference image ring buffer stores a reference image inputted by a stream. The pattern matching engine is coupled to the NIR image buffer and the reference image ring buffer. The pattern matching engine performs a depth computation according to the NIR image and the reference image to output at least one depth value.

In one embodiment, a plurality of lines of pixels of the reference image are stored in the reference image ring buffer line by line, and a maximum line amount of the reference image ring buffer is less than a total line amount of the reference image.

In one embodiment, a consequent line of pixels of the reference image is stored in the reference image ring buffer to overwrite a line of the reference image stored in the reference image ring buffer.

In one embodiment, a height or a width of the depth computation is reconfigurable.

In one embodiment, a height of the depth computation is less than the maximum line amount of the reference image ring buffer.

In one embodiment, the pattern matching engine maintains two address rang pointers for pointing a reading range of the reference image ring buffer, and the pattern matching engine updates the address range pointers after finishing the depth computation for a line of pixels of the NIR image.

In one embodiment, the NIR image buffer only stores a part of quantized pixels of the NIR image, and the reference image ring buffer only stores a part of quantized pixels of the reference image.

In one embodiment, the image depth decoder further comprises an original NIR image buffer and a quantizer. The original NIR image buffer stores an original image of the NIR image. The quantizer is coupled to the original NIR image buffer for quantizing the original image of the NIR image.

In one embodiment, the image depth decoder further comprises an input interface coupled to an NIR camera for receiving the NIR image from the NIR camera.

A computing device comprises an image depth decoder as mentioned above and a memory coupled to the image depth decoder. The memory stores a reference image.

As mentioned above, in the image depth decoder, the NIR image and the reference image are sent to and stored in the NIR image buffer and the reference image ring buffer by streams. The image depth decoder can perform a depth computation based on a part of the column subsets of the NIR images and reference images. In other words, the disclosure can perform the depth computation without loading the data of the entire frame. Accordingly, the image depth decoder does not need a large frame buffer for storing the data of the entire frame, and the design of the ring buffer can reduce the total circuit layout area.

BRIEF DESCRIPTION OF THE DRAWINGS

The disclosure will become more fully understood from the detailed description and accompanying drawings, which are given for illustration only, and thus are not limitative of the present disclosure, and wherein:

FIG. 9 is a schematic diagram showing the operation sequence of the image depth decoder according to an embodiment of this disclosure.

DETAILED DESCRIPTION OF THE DISCLOSURE

The present disclosure will be apparent from the following detailed description, which proceeds with reference to the accompanying drawings, wherein the same references relate to the same elements.

Figure 1:
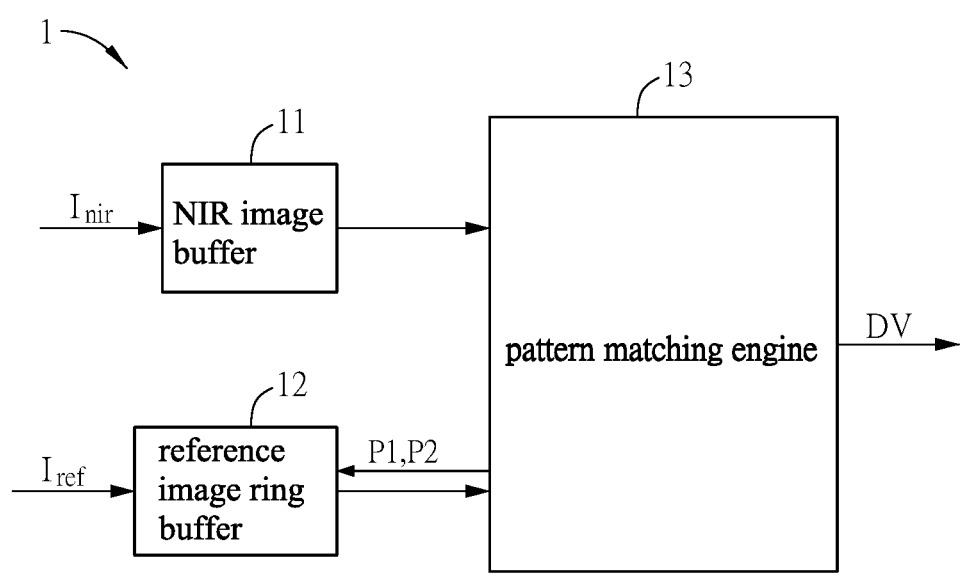
FIG. 1 is a block diagram of an image depth decoder according to an embodiment of this disclosure.

FIG. 1 is a block diagram of an image depth decoder according to an embodiment of this disclosure. As shown in FIG. 1, an image depth decoder 1 comprises an NIR image buffer 11, a reference image ring buffer 12, and a pattern matching engine 13. The NIR image buffer 11 stores an NIR image Inir inputted by a stream. The reference image ring buffer 12 stores a reference image Iref inputted by a stream. The pattern matching engine 13 is coupled to the NIR image buffer 11 and the reference image ring buffer 12. The pattern matching engine 13 performs a depth computation according to the NIR image Inir and the reference image Iref to output at least one depth value DV. Accordingly, a plurality of depth values DV can be generated for creating a depth image, and the pixels of the depth image are corresponding to the pixels of the NIR image Inir and the reference image Iref. Based on the orientation modes and search range, the pattern matching engine 13 can take multiple lines of pixel data of the NIR image Inir and multiple lines of pixel data of the reference image Iref simultaneously column by column at each clock, and conduct the pattern matching algorithm to find the disparity, which is further converted to depth. The orientation modes comprises a landscape mode and a portrait mode.

For example, after performing the depth computations of the entire NIR image Inir and the reference image Iref, a plurality of depth values DV can be obtained for creating a depth image. The reference image Iref can be a color image or a gray-level image. The color image can be an RGB image, YMCK image or YUV image. The reference image Iref can be a visible light image, such as a visible light color image or a visible light gray-level image.

For example, the NIR image Inir can be captured by an NIR camera. The NIR camera comprises an NIR light source and an NIR sensor. The NIR light source can project a cloud of light dots onto an object, and then the NIR sensor captures the reflected light from the object so as to form a 2D NIR image with encoded light dots information. Afterwards, the formed 2D NIR image can be transmitted to the image depth decoder 1 for the following depth computation.

The ring buffer 12 can store and load data with dynamic mapping. The pattern matching engine 13 maintains two address rang pointers P1 and P2 for pointing a reading range of the ring buffer 12. The pixel data of the reference image Iref can be stored in the ring buffer 12 line by line (one line or subset), and each line of the pixel data occupies a single line in the ring buffer 12. This will make it possible to access each line of the pixel data individually and independently.

The NIR image Inir and the reference image Iref can be stored in the buffer 11 and the ring buffer 12, respectively, by a stream. When the image depth decoder 1 only needs a part of subsets of lines of the NIR image Inir and the reference image Iref for performing the depth computation. In other words, the image depth decoder 1 can still perform the depth computation without loading the entire frame of the image. Thus, the design of the ring buffer 12 can reduce the total circuit layout area.

The image depth decoder 1 can be implemented in a chip, and the buffer 11 and the ring buffer 12 can be implemented by an on-chip memory. For example, the on-chip memory can be an SRAM or DRAM. The buffer 11, the ring buffer 12 and the pattern matching engine 13 can be implemented in a single chip. The design of the ring buffer 12 can reduce the total circuit layout area in the chip. In addition, the buffer 11 can also be designed as another ring buffer.

Figure 2A:
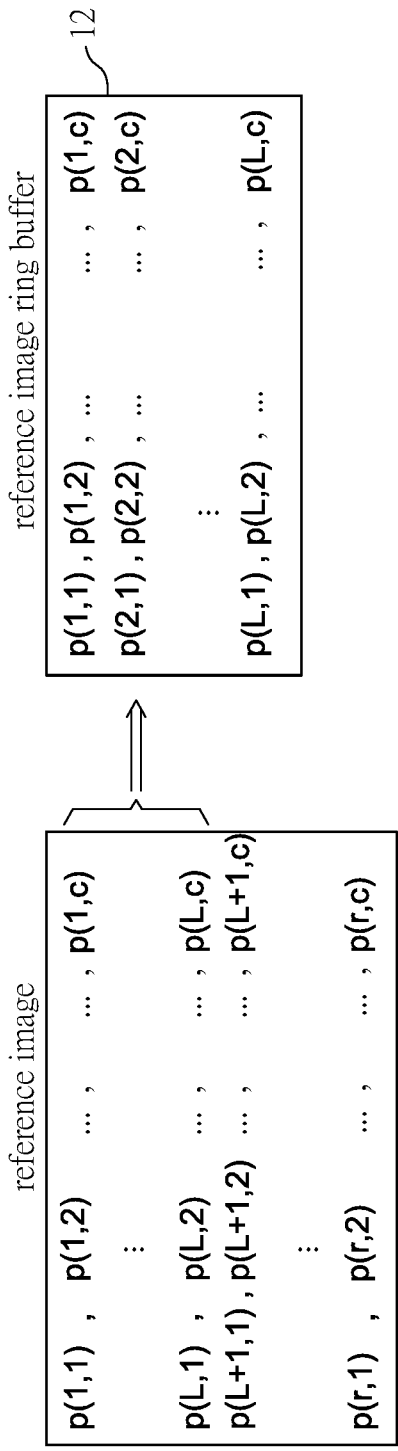
FIGS. 2A and 2B are schematic diagrams showing the case of storing data into the reference image ring buffer according to an embodiment of this disclosure.
Figure 2B:
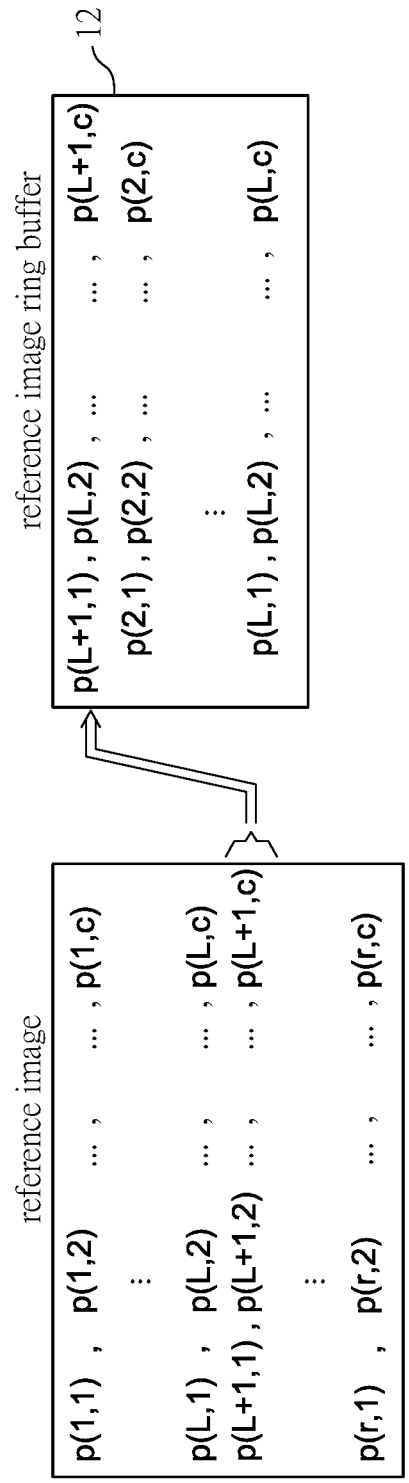

FIGS. 2A and 2B are schematic diagrams showing the case of storing data into the reference image ring buffer according to an embodiment of this disclosure. As shown in FIGS. 2A and 2B, the ring buffer 12 comprises at least L lines of storage space. The reference image Iref comprises r lines and c columns. The multiple lines of pixels of the reference image Iref are stored into the ring buffer 12 line by line. A maximum line amount of the ring buffer 12 is less than a total line amount of the reference image Iref. A consequent line of pixels of the reference image Iref will be loaded into the ring buffer 12 to overwrite one line of pixels of the reference image previously stored in the ring buffer 12.

Referring to FIG. 2A, the ring buffer 12 does not store any line of pixels of the reference image Iref initially. In this case, the lines from 1 to L of the reference image Iref (containing pixels $p(1,1)$ to $p(L,c)$) will be first stored into the first line to the L line of the ring buffer 12.

Referring to FIG. 2B, the next line of the L line in the ring buffer 12 is the first line, so that the consequent line of pixels of the reference image Iref can be stored into the ring buffer 12 and overwrite the next line. The consequent line is stored into the line of the ring buffer 12 after the last line of the previous storing step. Generally, the consequent line is stored into the line of the ring buffer 12 next to the last line of the previous storing step. Accordingly, the L+1 line of the reference image Iref (containing pixels $p(L+1,1)$ to $p(L+1,c)$) will be stored into the ring buffer 12 to overwrite the first line of the ring buffer 12. Similarly, the L+k line of the reference image Iref (containing pixels $p(L+k,1)$ to $p(L+k,c)$) will be stored into the ring buffer 12 to overwrite the k line of the ring buffer 12. Herein, k is a natural number (0<k L+1).

A height of the depth computation is less than the maximum line amount of the ring buffer 12. For example, the depth computation requires q lines of pixel data (q is less than or equal to L), and q is depending on the scale of the depth computation. Before storing q lines of pixel data into the ring buffer 12, the depth computation is not started yet because the required data for the depth computation are not ready. After storing at least q lines of pixel data into the ring buffer 12, the depth computation can be started. The process for fetching data from the ring buffer 12 is controlled independently from the process for storing data into the ring buffer 12, and is to fetch one or multiple lines of pixel data for depth computation. In addition, the external circuit can also store the consequent line of pixels of the reference image Iref into the ring buffer 12 to overwrite the previous pixel data. The updated consequent lines of pixel data can be fetched later for the following depth computations.

Figure 3A:
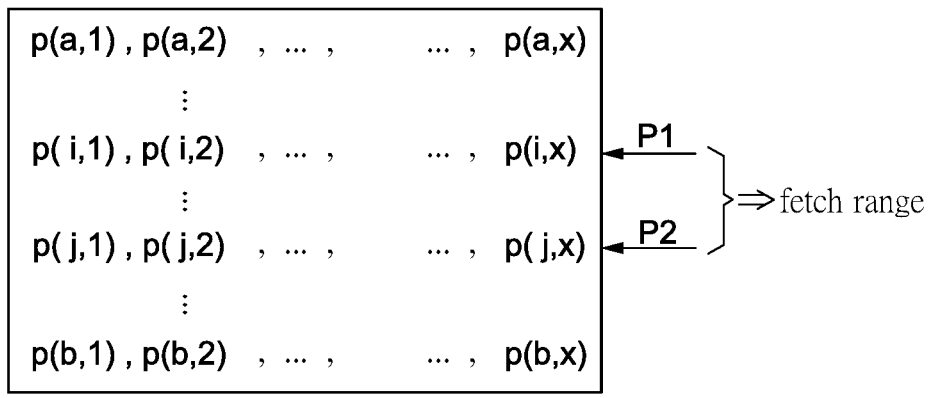
FIGS. 3A to 3C are schematic diagrams showing the case of fetching data from the reference image ring buffer according to an embodiment of this disclosure.
Figure 3B:
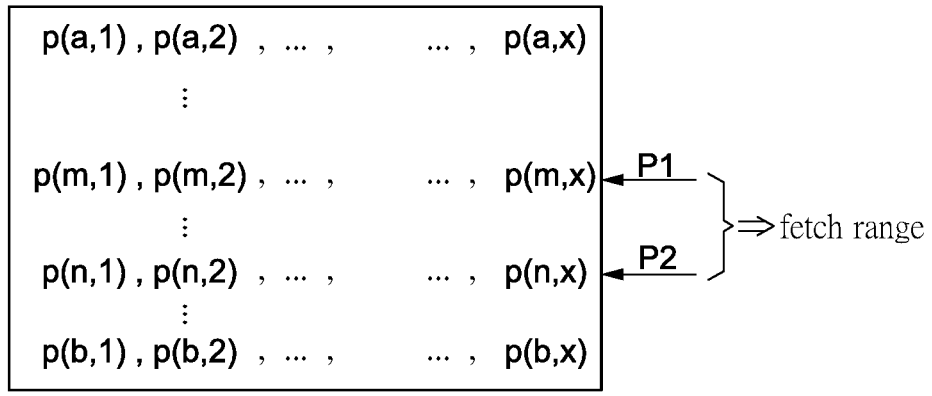
Figure 3C:
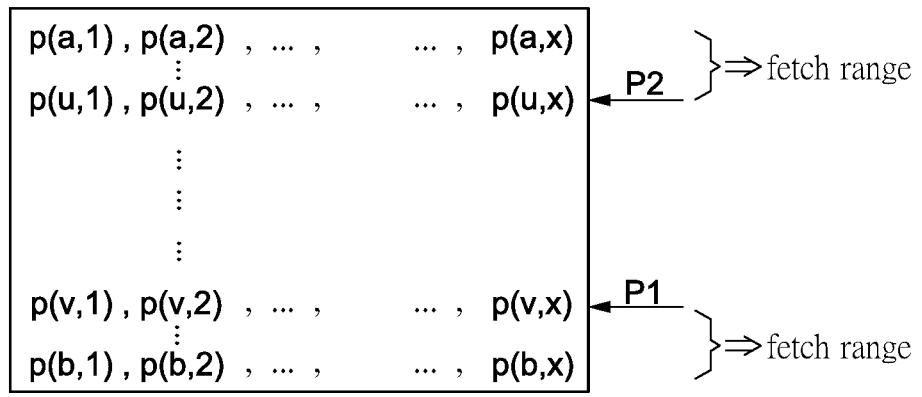

FIGS. 3A to 3C are schematic diagrams showing the case of fetching data from the reference image ring buffer according to an embodiment of this disclosure. Referring to FIG. 3A, the pattern matching engine 13 maintains two address rang pointers P1 and P2 for pointing a reading range of the ring buffer 12. Once the depth computation for one line of pixels of the NIR image is finished, the pattern matching engine 13 updates the address range pointers P1 and P2 for performing the following depth computation of another line of pixels. In general, under the processing procedure of the same frame, the updated rang pointers P1 and P2 are to move the reading range in the ring buffer 12 while the reading range is remained in the same size.

For example, the address range pointers P1 and P2 indicate the head end and the tail end of the reading range. In other words, the reading range is a portion of the ring buffer 12 from the address range pointer P1 to the address range pointer P2 along the line writing direction of the data of the reference image. The address tail end of the ring buffer 12 is physically located next to the address head end of the ring buffer 12. If the data of the reference image are written into the ring buffer 12 from the physical address head end to the physical address tail end but are not finished yet, the residual data will be written continuously from the physical address head end of the ring buffer 12 until reaching the address range pointer P2.

As shown in FIG. 3A, the a to b lines of pixel data of the reference image Iref are stored in the ring buffer 12, and each line comprises x pixels. The address range pointers P1 and P2 point the portion from the i line to the j line, so that the pattern matching engine 13 can fetch the data from the i line to the j line of the ring buffer 12 for performing the k depth computation. After fetching the data from the i line to the j line, the pattern matching engine 13 updates the address range pointers P1 and P2 for fetching the data from the ring buffer 12 used in the following k+1 depth computation. For example, as shown in FIG. 3B, the data for the k+t depth computation can be fetched from the m line to the n line of the ring buffer 12 (t>0). In this case, the pattern matching engine 13 updates the address range pointers P1 and P2 to point to the m line and the n line, respectively.

During the process of updating the address range pointers, if the address range point exceeds the physical address tail end of the ring buffer 12, the address range point will be moved to the physical address head end of the ring buffer 12. For example, as shown in FIG. 3C, the address range pointers P1 and P2 points to the v line and the u line, respectively, and the required data for the k+t depth computation can be fetched from the v line to the b line and from the a line to the u line of the ring buffer 12 (t>0).

The configuration of ring buffer 12 can decrease the amount of the on-chip memory, and the control complexity of the ring buffer 12 can be solved by designing a control logic. According to the above configurations, this disclosure can efficiently use the advantage of the ring buffer 12 and solve the control logic complexity of the pattern matching engine 13 caused by the ring buffer 12.

Figure 4A:
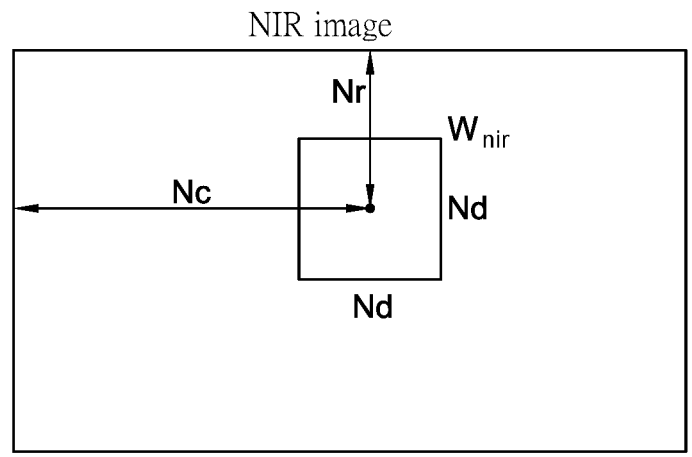
FIGS. 4A to 4C are schematic diagrams showing the case that the pattern matching engine performs the depth computation according to an embodiment of this disclosure.
Figure 4B:
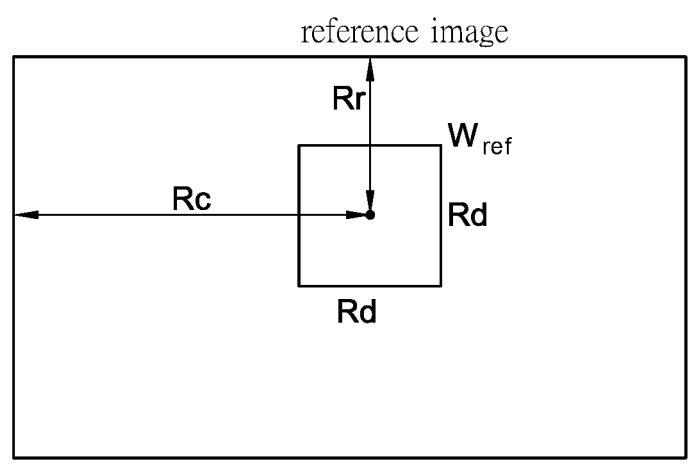
Figure 4C:
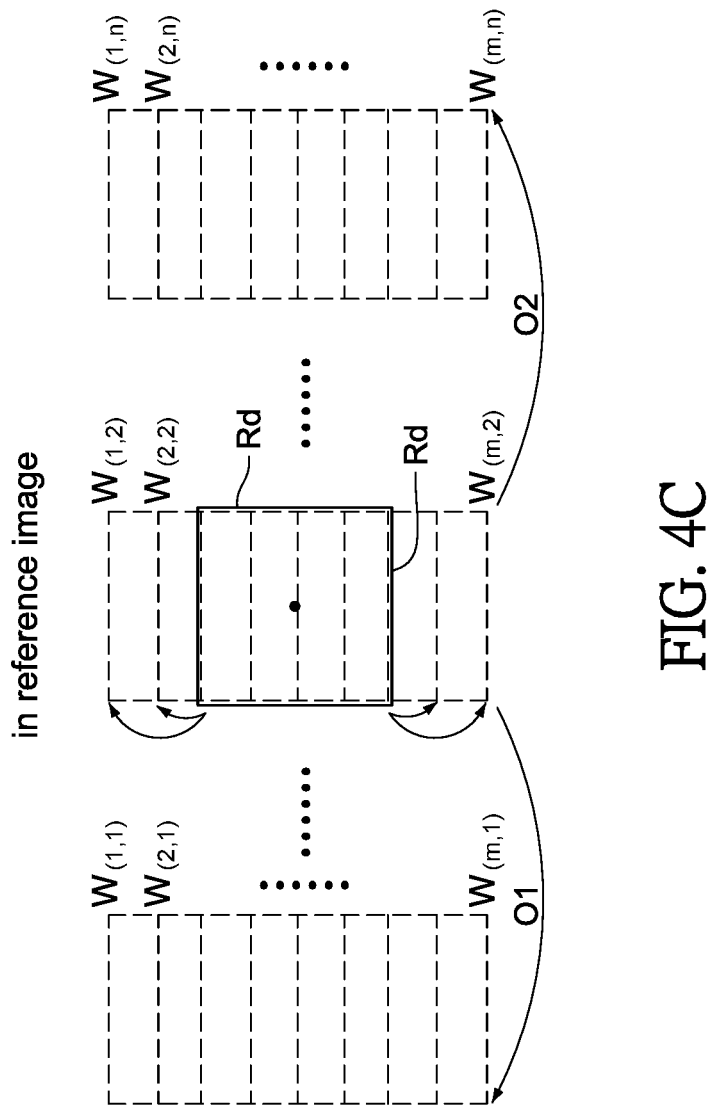

FIGS. 4A to 4C are schematic diagrams showing the case that the pattern matching engine performs the depth computation according to an embodiment of this disclosure. The searching range of the pattern matching depends on the camera parameters and the depth resolution specification. The pattern matching routine can be carried out by calculating the correlation factor within a certain searching range based on the corresponding pixel positions of the NI Rime Inir and the reference image Iref, calculating the disparity according to the extreme value of the correlation factor, and then translating the disparity into the depth value.

Referring to FIG. 4A, regarding a wind area Wnir selected for a designated pixel in the NIR image Inir, the designated pixel and the reference point have a horizontal distance Nc and a vertical distance Nr, and the height and width of the window area Wnir are, for example, both Nd. The units of the horizontal distance Nc, the vertical distance Nr, and the height and width Nd are pixel numbers. The designated pixel is located at the center of the window Wnir. Of course, the designated pixel can also be located at a corner of the window Wnir or any other position.

As shown in FIG. 4B, corresponding to the position of the designated pixel in the NIR image Inir of FIG. 4A, a corresponding pixel in the reference image Iref is selected, and a wind area Wref corresponding to the selected corresponding pixel is selected. The corresponding pixel and the reference point have a horizontal distance Rc and a vertical distance Rr, and the height and width of the window area Wref are, for example, both Rd. The units of the horizontal distance Rc, the vertical distance Rr, and the height and width Rd are pixel numbers. The ratio of the horizontal distance Nc to the vertical distance Nr is equal to the ratio of the horizontal distance Rc to the vertical distance Rr, and the height and width Nd of the window area Wnir are equal to the height and width Rd of the window area Wref.

As shown in FIG. 4C, the pixel data in the window area Wnir and the pixel data in the window area Wref are collected for calculating a correlation coefficient. During the searching process of the pattern matching, the position of the window area Wnir is not changed, but the position of the window area Wref is moved within the searching range in the reference image Iref. The searching range can be, for example, defined by an area with the corresponding pixel as the center and having a first offset O1 and a second offset O2. Herein, the searching range comprises totally m lines, and the first offset O1 and the second offset O2 comprise totally n pixels. Within the searching range, the position of each pixel in the window area can be represented by W(x,y) (1≤x≤m, 1≤y≤n). The pixel data of the pixels W(x,y) and the pixel data in the window area Wnir are collected for calculating a correlation coefficient fc. Accordingly, a plurality of correlation coefficients fc can be obtained after conducting the calculations for each pixel W(x,y) in the window area. The correlation coefficient matrix F is shown as follow:

correlation coefficient=$f_c(W_{(x,y)}, W_{nir})$ $$F = \begin{bmatrix} F_c(W_{(1,1)}, W_{nir}) & \cdots & f_c(W_{(1,n)}, W_{nir}) \\ \vdots & \ddots & \vdots \\ F_c(W_{(m,1)}, W_{nir}) & \cdots & F_c(W_{(m,n)}, W_{nir}) \end{bmatrix}$$

The correlation coefficient represents the similarity between the window area Wnir and the window area W(x,y). The higher score of the correlation coefficient means a higher similarity. The highest score of the correlation coefficient fc and the window area W(x,y) thereof can be found by the correlation coefficient array F, and the distance between the window area W(x,y) with the highest score and the corresponding pixel (or the window area Wref thereof) is translated into the disparity. Then, the disparity is further translated into the depth value DV.

The height or width of the depth computation is reconfigurable. The height or width of the depth computation can be defined by the first offset O1 and the second offset O2. The first offset O1 and the second offset O2 are the major search direction of the pattern matching, which is related to the orientation of the camera. The scales of the offsets can be set according to the operation situation. The search in the direction perpendicular to the offset direction should consider the slight mismatch and perform a proper compensation. Accordingly, the required lines or columns for this direction can be reduced.

Figure 4D:
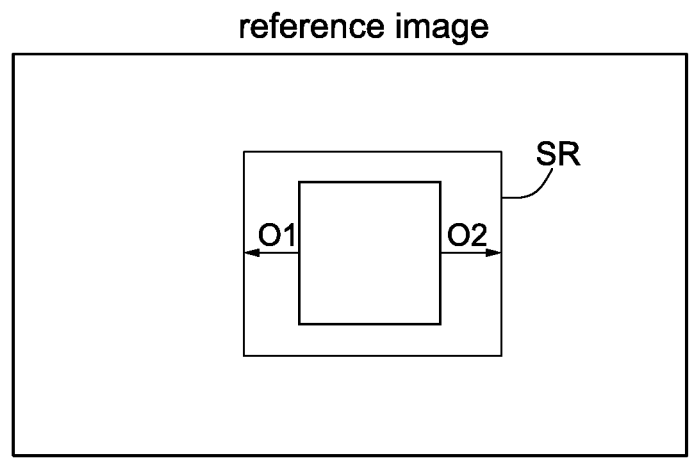
FIGS. 4D and 4E are schematic diagrams showing the offsets of the pattern matching in different orientation modes according to an embodiment of this disclosure.
Figure 4E:
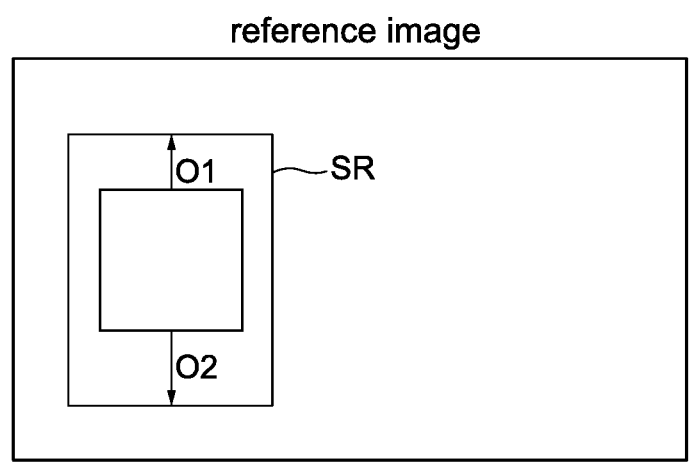

FIGS. 4D and 4E are schematic diagrams showing the offsets of the pattern matching in different orientation modes according to an embodiment of this disclosure. As shown in FIG. 4D, the NIR light emitter and the NIR camera are placed coplanar with each other while their optical axes are in parallel, and the epipolar lines thereof are running in the horizontal direction. Therefore, the disparity search will be conducted in the horizontal direction of the reference image Iref. The horizontal search range is defined by the first offset O1 and the second offset O2. The first offset O1 is a left offset, and the second offset O2 is a right offset. To compensate a slight mismatch in the vertical direction, a small fixed range of the vertical search is also conducted along with the horizontal search. The entire search range SR can be defined by the horizontal search range and the vertical search range. The first offset O1 and the second offset O2 can be configurable flexibly to work with different camera settings, and the width of the depth computation is configurable.

For example, FIG. 4D shows a search process in a landscape mode. In this case, 21 lines of pixel data of the NIR image are needed, and 25 lines or 180 lines of pixel data of the reference image are needed depending on the orientation mode defined by the camera. FIG. 4E shows a search process in a portrait mode. The horizontal and vertical search ranges in the portrait mode (FIG. 4E) and the horizontal and vertical search ranges in the landscape mode (FIG. 4D) are swapped. In the portrait mode, 21 lines of pixel data of the NIR image are needed, and 180 lines of pixel data of the reference image are needed. The height of the depth computation is reconfigurable.

Figure 5:
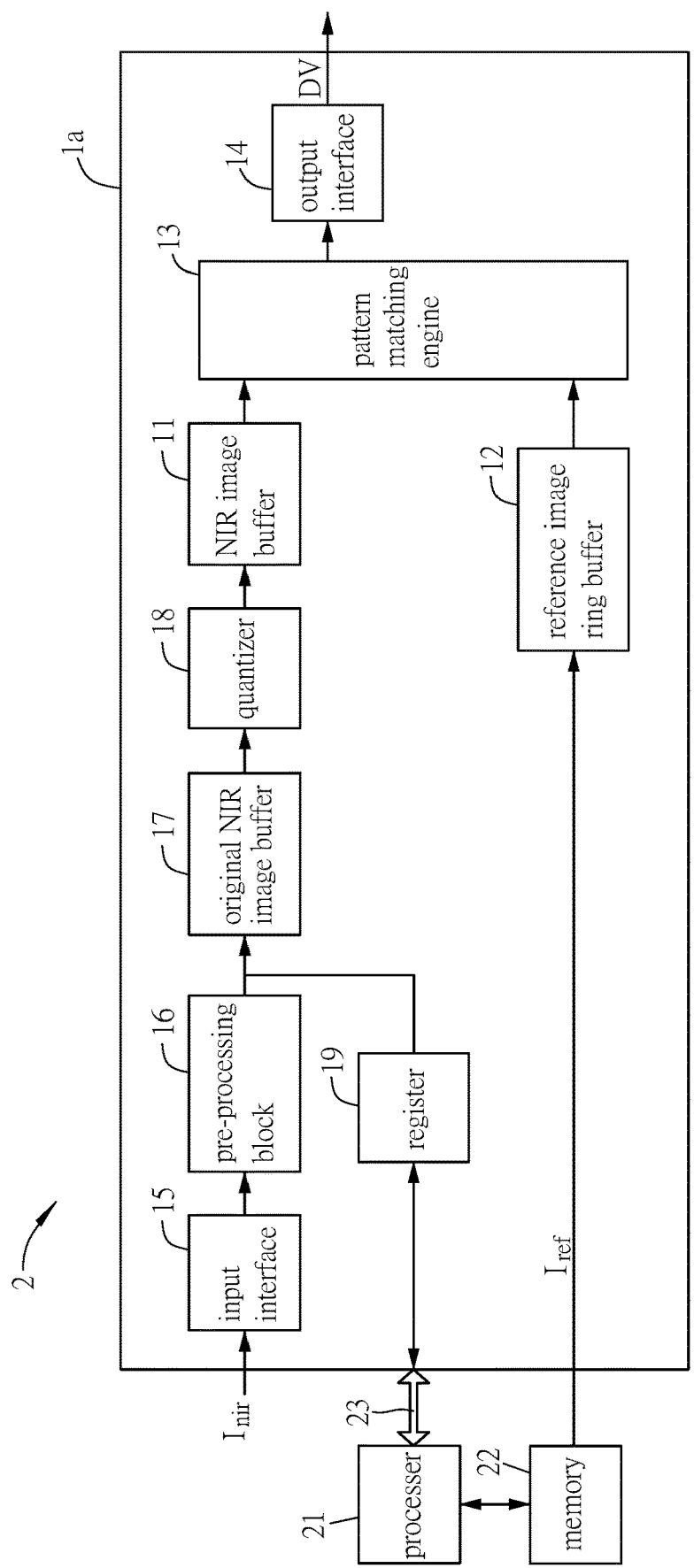
FIG. 5 is a block diagram of a computing device and an image depth decoder according to an embodiment of this disclosure.

FIG. 5 is a block diagram of a computing device and an image depth decoder according to an embodiment of this disclosure. As shown in FIG. 5, a computing device comprises an image depth decoder 1a, a processor 21, a memory 22, and a BUS 23. The memory 22 stores the reference image Iref and is coupled to the image depth decoder 1a. The memory 22 can be a non-volatile memory or a volatile memory. The BUS 23 is coupled to the processor 21 and the image depth decoder 1a. The processor 21 can receive the statistical information or data of the NIR image Inir from the image depth decoder 1a through the BUS 23. The processor 21 also transmits the setup configurations to the image depth decoder 1a through the BUS 23. The processor 21 is also coupled to the memory 22. For example, the processor 21 can store the generated or received reference image Iref to the memory 22.

The image depth decoder 1a further comprises an output interface 14, an input interface 15, a pre-processing block 16, an original NIR image buffer 17, a quantizer 18, and a register 19. For example, the computing device 2 can operate as follow. The processor 21 or other components located outside the image depth decoder 1a can setup the register 19 through the BUS 23, the ring buffer 12 of the image depth decoder 1a prepares the data of the reference image Iref, and the NIR image Inir is transmitted to the image depth decoder 1a by a stream. Afterwards, the stream continuously updates the ring buffer 12 line by line. The updating procedure should match the timing of sending the NIR image. In the output interface 14, the depth image is outputted line by line.

The output interface 14 is coupled to the pattern matching engine 13 for outputting the depth value DV. In this embodiment, the output interface 14 can output the depth image constructed by the depth value DV line by line. The input interface 15 is coupled to an NIR camera for receiving the NIR image Inir from the NIR camera. The NIR image Inir can be a raw image. The pre-processing block 16 is coupled to the input interface 15 for per-processing the NIR image Inir, and the pre-processed image is transmitted to the original NIR image buffer 17. The pre-processing comprises a black level subtraction and a gamma correction. After the pre-processing, the original 10-bit pixels can be converted into 8-bit pixels. The original NIR image buffer 17 is coupled to the pre-processing block 16 and stores the original image of the NIR image. The original NIR image buffer 17 can be a line buffer. For example, the original NIR image buffer 17 contains 7 lines of storage space for storing 7 lines of the streamed original NIR image.

The quantizer 18 is coupled to the original NIR image buffer 17 for quantizing the original image of the NIR image. The quantizer 18 can quantize the original image data from 8 bits to 1 bit per pixel. The quantized NIR image data are outputted to the buffer 11. The buffer 11 is coupled to the quantizer 18 for storing the quantized NIR image. The buffer 11 contains 21 lines of storage space for storing 21 lines of pixel data of the streamed quantized NIR image.

In addition, the reference image Iref can also be quantized. For example, the ring buffer 12 can hold the pixel data of the quantized reference image Iref (1 bit for each pixel). Herein, the ring buffer 12 contains 181 lines of storage space for storing the 181 lines of pixel data of the streamed quantized reference image. Accordingly, the buffer 11 may only store a part of the quantized pixels of the NIR image Inir, and the ring buffer 12 may only store a part of the quantized pixels of the reference image Iref. Since the required image data for the depth computation are all quantized, the total data amount for the computation can be reduced, thereby increasing the computation speed. In addition, since the required image data for the depth computation are all quantized and inputted by streams, the scale of the buffer for storing the image data can be reduced, thereby saving the circuit layout area. Although the image data have been quantized, the depth reconstruction precision can still be maintained.

The register 19 is coupled to the BUS 23 for receiving the setup configurations, which comprise the parameters of the NIR image Inir and/or the parameters of the pattern matching engine 13. For example, the processor 21 can program the register 19 for adjusting the resolution or frame decoding rate of the input image. Accompanying the input of the NIR image, some statistical information can be generated, or some parameters can be extracted and stored in the register 19. The processor 21 can retrieve the statistical information or parameters from the register 19. For example, the processer 21 can control the auto exposure control (AEC) of the camera according to the extracted parameters. The statistical information can be generated after finishing the process of the entire frame or a whole NIR image, and an interrupt can be generated to announce the processor 21 after finishing the process.

The image depth decoder 1a can be implemented inside a chip or as a chip, and the buffer 11, the ring buffer 12 and the buffer 17 can be the on-chip memory. For example, the memory can be SRAM or DRAM. The design of the ring buffer can save the circuit layout area inside the chip. In addition, the buffer 11 can also be designed as a ring buffer.

Figure 6A:
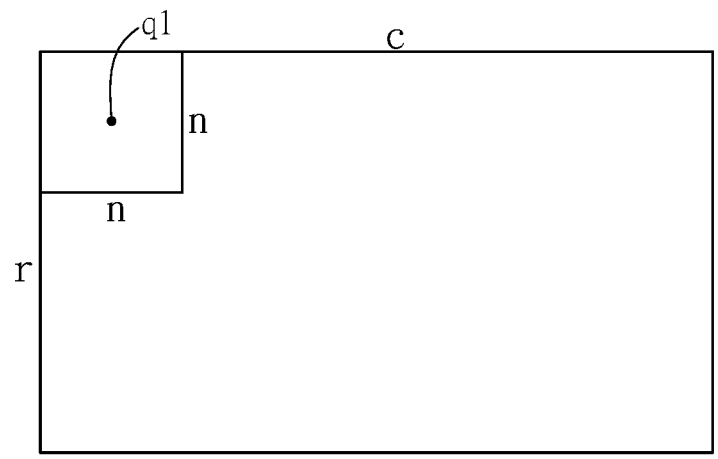
FIGS. 6A to 6C are schematic diagrams showing the case of quantizing the NIR image according to an embodiment of this disclosure.
Figure 6B:
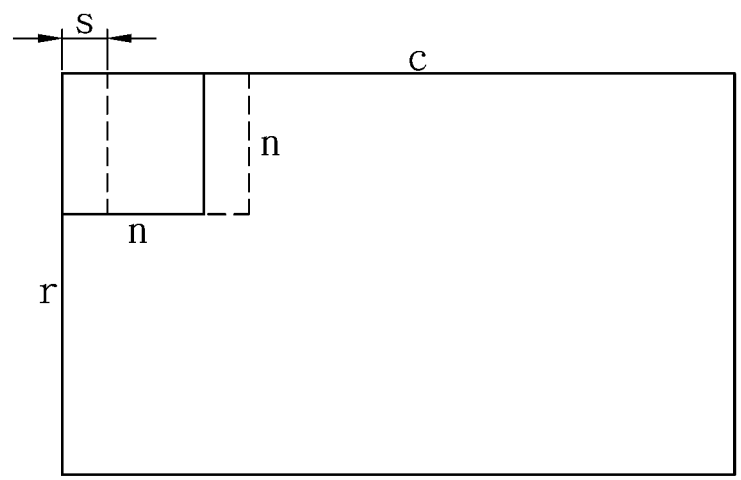
Figure 6C:
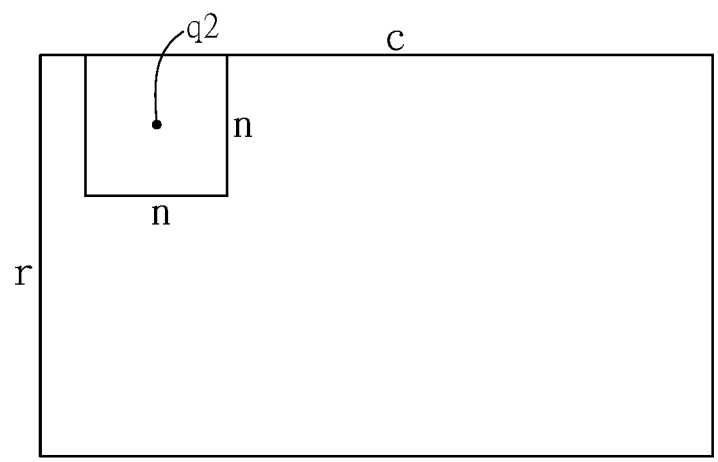

FIGS. 6A to 6C are schematic diagrams showing the case of quantizing the NIR image according to an embodiment of this disclosure. As shown in FIG. 6A, the original NIR image comprises r lines and c columns. A range window is selected for quantization calculation of a pixel q1, wherein the length and width of the range window are n pixels. Of course, the length and width of the range window can be different. The quantization of the pixel q1 is generated based on the values of all pixels in the range window. As shown in FIG. 6B, after finishing the quantization calculation of one pixel, the range window will be moved by s pixel(s) (e.g. s=1). As shown in FIG. 6C, after moving the range window to neat pixel q 2, the quantization of the pixel q2 will be generated based on the values of all pixels in the range window. The quantization calculations can be performed for all pixels.

In addition, regarding the pixel located around the image boundary, the related range window may exceed the boundary. In this case, the parts of the range window exceeding the boundary are filled with 0 (the extreme value of gray-level), so that the resolution of the image will maintain the same before or after the quantization. Alternatively, it is also possible to define that the range window cannot exceed the boundary of the image. The quantization of this design will generate an image with a slightly smaller resolution. Besides, it is needed to consider the boundary corresponding when the pattern matching reads the reference image. Moreover, any of other quantization method that can maintain the same resolution in the boundary situation can be adopted.

Figure 7A:
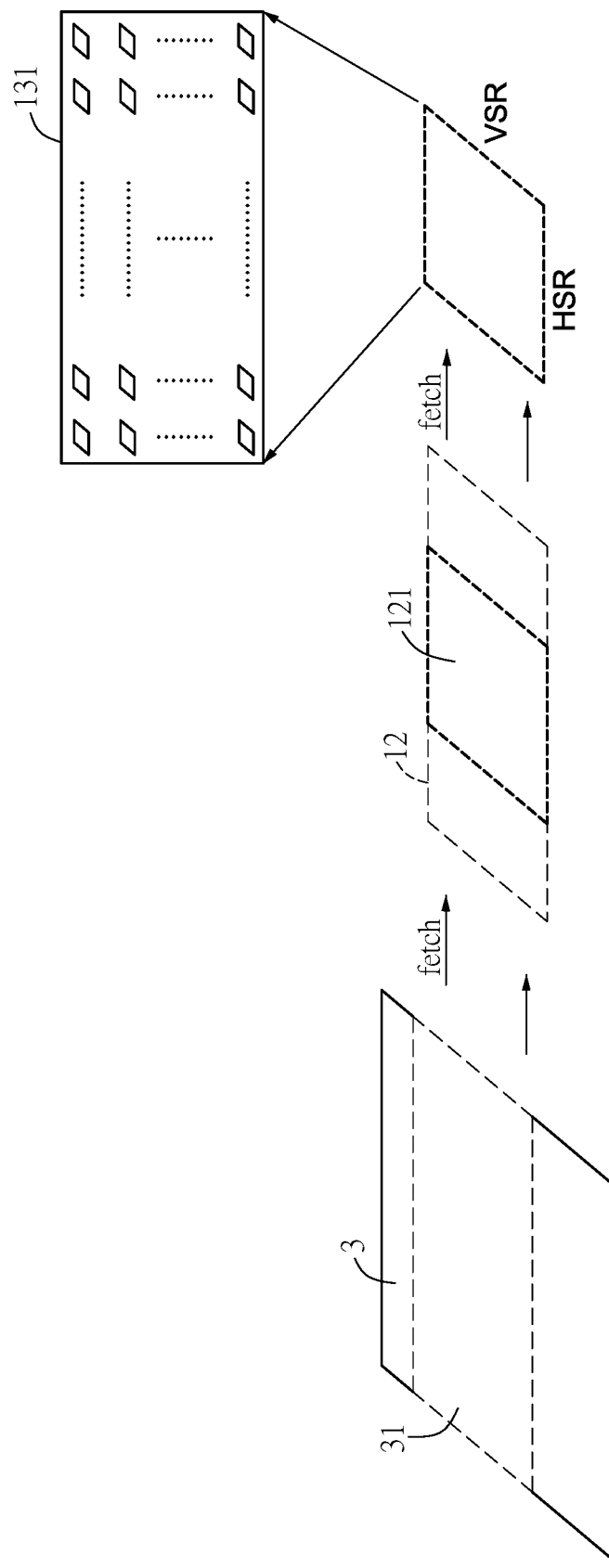
FIGS. 7A to 7C are schematic diagrams showing the pattern matching applied in different input/output resolution ratios according to an embodiment of this disclosure.
Figure 7B:
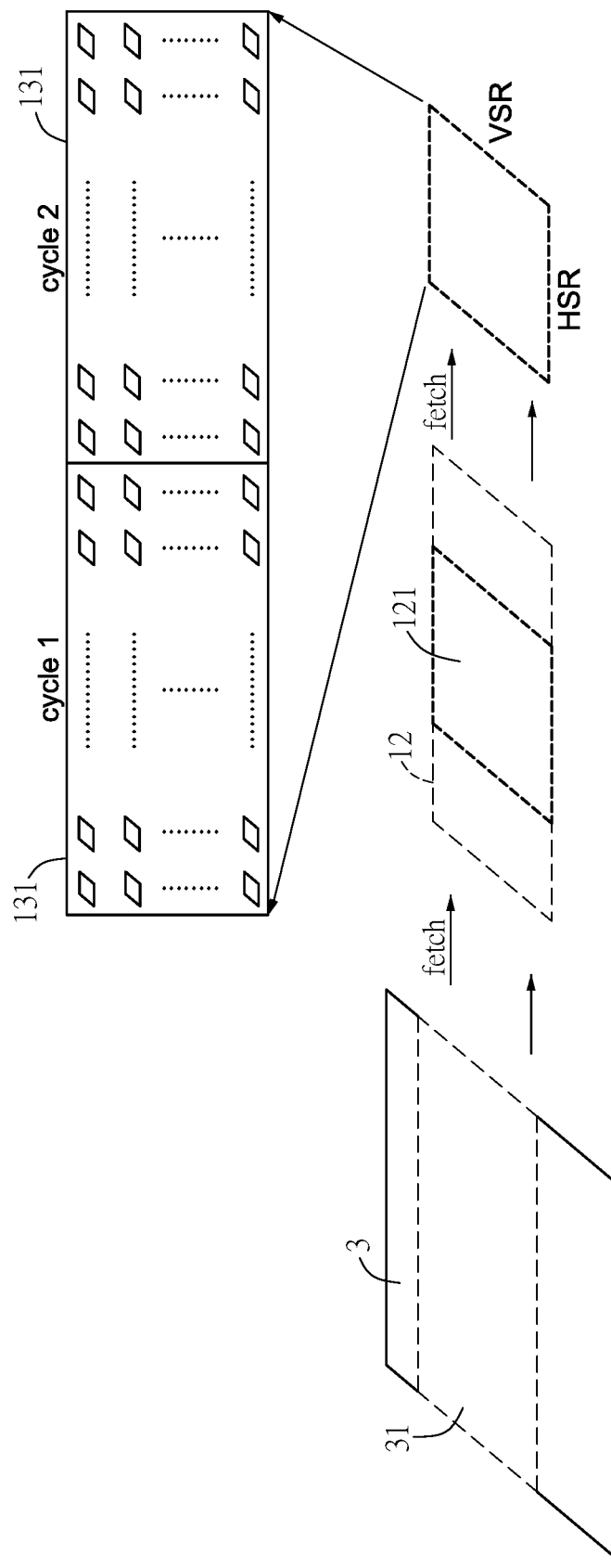
Figure 7C:
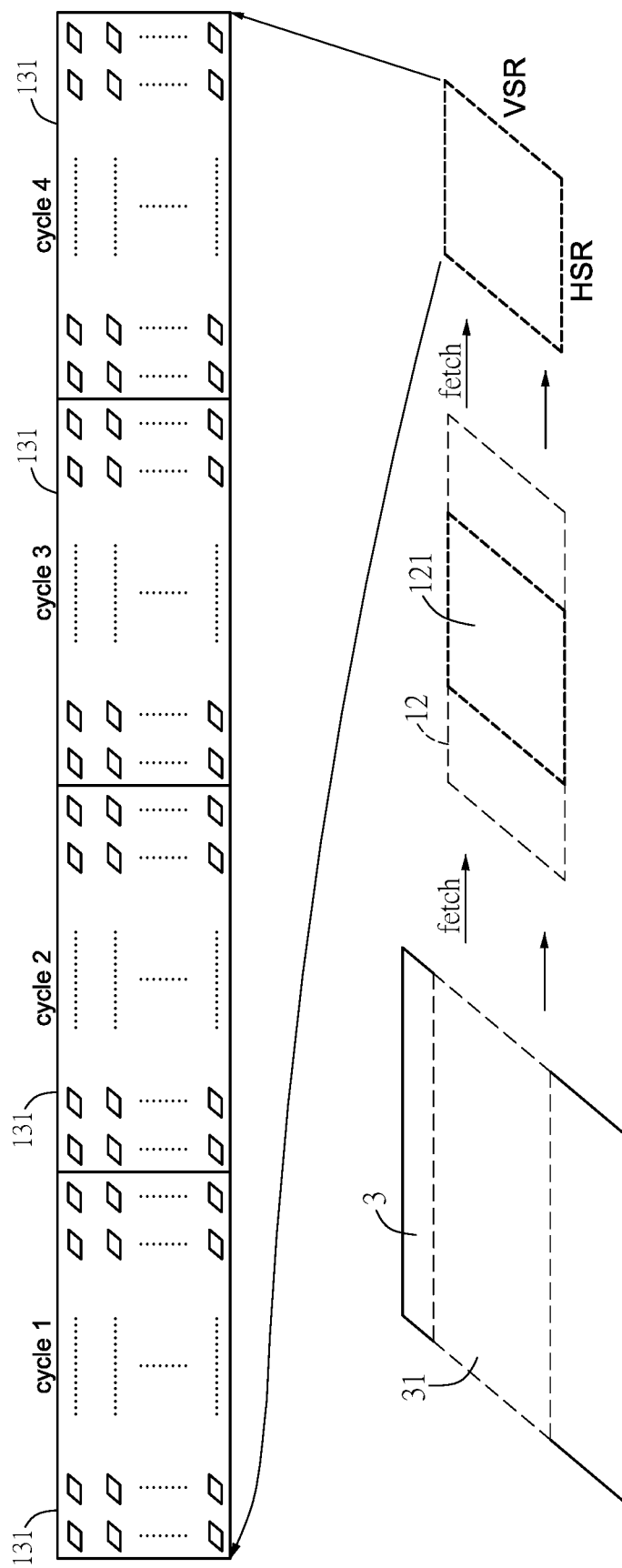

FIGS. 7A to 7C are schematic diagrams showing the pattern matching applied in different input/output resolution ratios according to an embodiment of this disclosure. As shown in FIG. 7A, the inputted reference image 3 and the inputted depth image have the same resolution. The line subset 31 of the reference image 3 is fetched from the memory 22 and stored into the ring buffer 12. When the correlation computation units 131 of the pattern matching engine 13 perform the pattern matching, the search range may not include the entire line or column (e.g. a half line). For example, the horizontal search range or the vertical search range is halved. Accordingly, it is possible to fetch a part of the pixel data 121 from the ring buffer 12 for performing the pattern matching computation. The width of the depth computation is less than a half of the maximum column amount of the ring buffer 12.

As shown in FIG. 7B, the resolution of the outputted depth image is ¼ of the resolution of the inputted reference image 3, the height of the outputted depth image is ½ of the height of the inputted reference image 3, and the width of the outputted depth image is ½ of the width of the inputted reference image 3. Compared with the case of FIG. 7A, since the amounts of the correlation computation units 131 are the same, the search range of the pattern matching is doubled in both the horizontal and vertical directions.

As shown in FIG. 7C, the resolution of the outputted depth image is 1/16 of the resolution of the inputted reference image 3, the height of the outputted depth image is ¼ of the height of the inputted reference image 3, and the width of the outputted depth image is ¼ of the width of the inputted reference image 3. Compared with the case of FIG. 7A, since the amounts of the correlation computation units 131 are the same, the search range of the pattern matching is quadrupled in both the horizontal and vertical directions.

Figure 8A:
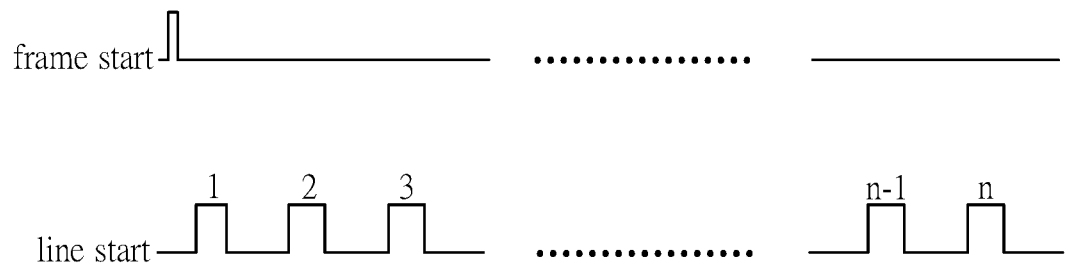
FIGS. 8A and 8B are schematic diagrams showing the operation clocks of the image depth decoder according to an embodiment of this disclosure.
Figure 8B:
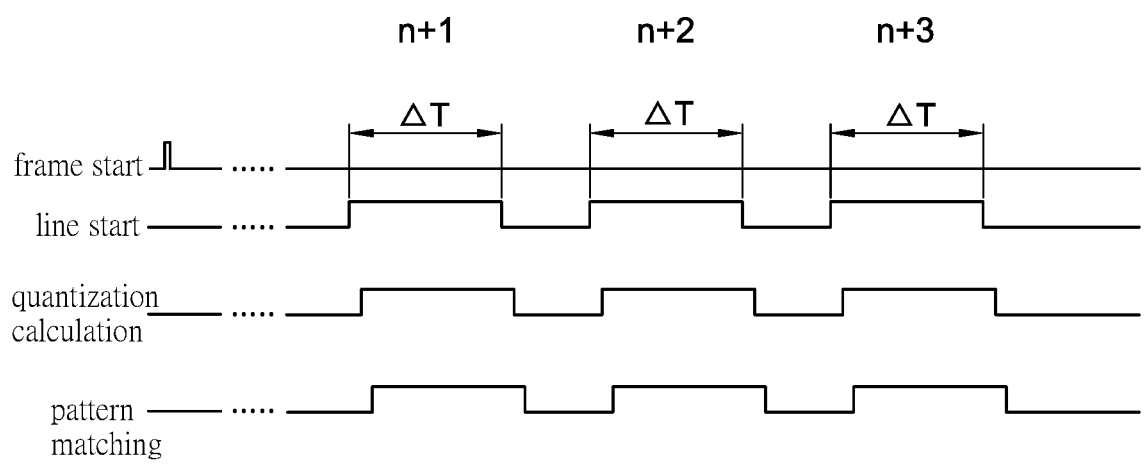

FIGS. 8A and 8B are schematic diagrams showing the operation clocks of the image depth decoder according to an embodiment of this disclosure. As shown in FIG. 8A, when the frame starts, the NIR image and the reference image are inputted into the image depth decoder line by line, and one line is loaded within each line cycle in the line start. The pattern matching needs a certain number of lines of pixel data (e.g. n lines), and the n lines of pixel data must be loaded from the reference image during the 1~n line cycles for ensuring that the pattern matching can be correctly performed. n may has different configurations for different orientation modes. For example, n is 23 in the landscape mode, or n is 180 in the portrait mode.

As shown in FIG. 8B, the pattern matching starts from the (n+1)th line cycle. In addition, the NIR image and the reference image can also be quantized. The quantization can be performed before the (n+1)th line cycle. For example, the quantization can be performed after loading the first 7 lines of pixel data of the NIR image. If one line comprises m pixels and ΔT has m clock cycles, one pixel can be loaded within one clock cycle. Accordingly to the resolution of the image, m can be, for example, 1296, 1244, 640, or the likes.

FIG. 9 is a schematic diagram showing the operation sequence of the image depth decoder according to an embodiment of this disclosure. The 1~736 lines of the original NIR image are inputted to the image depth decoder, and the quantizer starts to quantize the original NIR image after the $4^{th}$ line of the original NIR image is arrived, and then outputs the quantization result. The quantization results of the first three lines (1-3 lines) and the last three lines (734-736 lines) all have zero value. The pattern matching engine starts to perform the pattern matching after the $14^{th}$ line of the original NIR image is arrived and outputs the depth value of the first line. Since the down-sampling is used in the image vertical direction, the pattern matching engine outputs one line of output during every two-line interval of the original NIR image. The quantization results of the first ten lines (1-10 lines) and the last ten lines (359-368 lines) all have zero value.

The pattern matching algorithm essentially searches for the best disparity match between two images (the reference image and the NIR image). The performance of the correlation function greatly affects the accuracy of the disparity, which further affects the accuracy of the depth calculation. Therefore, to tolerate various NIR image conditions and get accurate disparity, the correlation function is well picked and tuned together with the quantization method used in the quantization step. In the image depth decoder, since the required image data for the depth computation are all quantized, the total data amount for the computation can be reduced, thereby increasing the computation speed. In addition, since the required image data for the depth computation are all quantized and inputted by streams, the scale of the buffer for storing the image data can be reduced, thereby saving the circuit layout area. The image data have been quantized, and the depth reconstruction precision can be maintained. The image depth decoder can also achieve a lower power and lower cost implementation with the real-time 3D reconstruction performance. In addition, the image depth decoder can also be applied to different input frame rate, and perform the real-time and precise 3D reconstruction process.

To sum up, in the image depth decoder, the NIR image and the reference image are sent to and stored in the NIR image buffer and the reference image ring buffer by streams. The image depth decoder can perform a depth computation based on a part of the column subsets of the NIR images and reference images. In other words, the disclosure can perform the depth computation without loading the data of the entire frame. Accordingly, the image depth decoder does not need a large frame buffer for storing the data of the entire frame, and the design of the ring buffer can reduce the total circuit layout area.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. An image depth decoder, comprising:
an NIR image buffer storing an NIR image inputted by a stream;
a reference image ring buffer storing a reference image inputted by a stream; and
a pattern matching engine coupled to the NIR image buffer and the reference image ring buffer, wherein the pattern matching engine performs a depth computation according to the NIR image and the reference image to output at least one depth value, and a height or a width of the depth computation is reconfigurable.

2. The image depth decoder according to claim 1, wherein a plurality of lines of pixels of the reference image are stored in the reference image ring buffer line by line, and a maximum line amount of the reference image ring buffer is less than a total line amount of the reference image.

3. The image depth decoder according to claim 1, wherein a consequent line of pixels of the reference image is stored in the reference image ring buffer to overwrite a line of the reference image stored in the reference image ring buffer.

4. The image depth decoder according to claim 2, wherein the height of the depth computation is less than the maximum line amount of the reference image ring buffer.

5. The image depth decoder according to claim 1, wherein the pattern matching engine maintains two address rang pointers for pointing a reading range of the reference image ring buffer, and the pattern matching engine updates the address range pointers after finishing the depth computation for a line of pixels of the NIR image.

6. The image depth decoder according to claim 1, wherein the NIR image buffer only stores a part of quantized pixels of the NIR image, and the reference image ring buffer only stores a part of quantized pixels of the reference image.

7. The image depth decoder according to claim 1, further comprising:
an original NIR image buffer storing an original image of the NIR image; and
a quantizer coupled to the original NIR image buffer for quantizing the original image of the NIR image.

8. The image depth decoder according to claim 1, further comprising:
an input interface coupled to an NIR camera for receiving the NIR image from the NIR camera.

9. A computing device, comprising:
a memory storing a reference image; and
an image depth decoder coupling to the memory and comprising:
an NIR image buffer storing an NIR image inputted by a stream;
a reference image ring buffer storing a reference image inputted by a stream; and
a pattern matching engine coupled to the NIR image buffer and the reference image ring buffer, wherein the pattern matching engine performs a depth computation according to the NIR image and the reference image to output at least one depth value, and a height or a width of the depth computation is reconfigurable.

10. The computing device according to claim 9, wherein a plurality of lines of pixels of the reference image are stored in the reference image ring buffer line by line, and a maximum line amount of the reference image ring buffer is less than a total line amount of the reference image.

11. The computing device according to claim 9, wherein a consequent line of pixels of the reference image is stored in the reference image ring buffer to overwrite a line of the reference image stored in the reference image ring buffer.

12. The computing device according to claim 10, wherein the height of the depth computation is less than the maximum line amount of the reference image ring buffer.

13. The computing device according to claim 9, wherein the pattern matching engine maintains two address rang pointers for pointing a reading range of the reference image ring buffer, and the pattern matching engine updates the address range pointers after finishing the depth computation for a line of pixels of the NIR image.

14. The computing device according to claim 9, wherein the NIR image buffer only stores a part of quantized pixels of the NIR image, and the reference image ring buffer only stores a part of quantized pixels of the reference image.

15. The computing device according to claim 9, wherein the image depth decoder further comprises:
an original NIR image buffer storing an original image of the NIR image; and
a quantizer coupled to the original NIR image buffer for quantizing the original image of the NIR image.

16. The computing device according to claim 9, wherein the image depth decoder further comprises:
an input interface coupled to an NIR camera for receiving the NIR image from the NIR camera.

* * * * *